US010937335B2

(12) United States Patent
Sequeira De Oliveira

(10) Patent No.: US 10,937,335 B2
(45) Date of Patent: Mar. 2, 2021

(54) INTRODUCED IN SETS OF STRUCTURAL PARTS FOR COMPOSITION OF ARCHITECTURAL DIDACTIC MATERIALS

(71) Applicant: Marcio Sequeira De Oliveira, São Paulo (BR)

(72) Inventor: Marcio Sequeira De Oliveira, São Paulo (BR)

(*) Notice: Subject to any disclaimer, the term of this patent is extended or adjusted under 35 U.S.C. 154(b) by 0 days.

(21) Appl. No.: 15/749,367

(22) PCT Filed: Sep. 14, 2016

(86) PCT No.: PCT/BR2016/000092
§ 371 (c)(1),
(2) Date: Jan. 31, 2018

(87) PCT Pub. No.: WO2018/049489
PCT Pub. Date: Mar. 22, 2018

(65) Prior Publication Data
US 2019/0197918 A1 Jun. 27, 2019

(51) Int. Cl.
*G09B 23/10* (2006.01)
*G09B 25/04* (2006.01)
*G09B 23/00* (2006.01)

(52) U.S. Cl.
CPC ............. *G09B 23/10* (2013.01); *G09B 23/00* (2013.01); *G09B 25/04* (2013.01)

(58) Field of Classification Search
CPC ......... G09B 23/00; G09B 23/10; G09B 25/04
See application file for complete search history.

(56) References Cited

U.S. PATENT DOCUMENTS 5,433,549 A * 7/1995 McGaffigan ......... A63H 33/042
403/170
5,640,811 A * 6/1997 Boyle .................... E04H 4/108
135/142

(Continued)

FOREIGN PATENT DOCUMENTS

BR  MU-8602813-8  5/2001
BR  PI-0303779-7  4/2005

OTHER PUBLICATIONS

International Search Report dated Feb. 15, 2017 in PCT/BR2016/000092.

*Primary Examiner* — Eddy Saint-Vil
(74) *Attorney, Agent, or Firm* — B. Aaron Schulman, Esq.; Stites & Harbison, PLLC

(57) ABSTRACT

Sets of structural parts (CPE) designed for the composition of Architectural didactic models (MD) for learning or research carried out by students, teachers, engineers, architects or anyone else interested in the subject; (CPE) comprise structural elements vertical and transverse sections (40) forming the pillars and beams and formed by springs (41) and (42) are cylindrical and helical, the traction and compression of which deformations (d1) or displacements (d2) of the structures (MD); (ii) metal cables (50) which comprises bracing and struts; (iii) plates (60) simulating slabs, walls and coverings made of plastic for horizontal locking, vertical and inclined between the elements (40) and (50) so as to simulate slabs, walls and roofs of a building; and (iv) groupings of links (AG), also, formed by labeled bonds (70) comprising balls metallic (71) for receiving the magnets (IM) of the elements (40) and (50) or other magnets (IM) of other structural parts (CPE) and rigid connections (90) configured by trapezoidal-shaped parts (91) where in at least that in three flat faces 91a, 91b and 91c are provided housings (r1) for magnet assembly (IM); the assembly of the (Continued)

parts CPE 30, 40, 50, 60 and (70) and inclusion of the base connection pieces (80), rigid links (90) and links (100) comprises a 'kit' (10) mounted in a compact housing (20) with a hinged lid (21) which includes an instruction manual (T1) where possible structures obtained with the arrangement of the parts Structural Funds (FPC).

12 Claims, 20 Drawing Sheets

(56) References Cited

U.S. PATENT DOCUMENTS

| | | | |
|---|---|---|---|
| 5,690,446 A | 11/1997 | Poissant et al. | |
| 6,748,962 B2 * | 6/2004 | Miller | E04B 1/3211 |
| | | | 135/120.3 |
| 6,840,700 B1 * | 1/2005 | Nusskern | F16B 1/0014 |
| | | | 403/179 |
| 6,869,246 B2 | 3/2005 | Bridgers | |
| 7,827,738 B2 * | 11/2010 | Abrams | E04B 1/003 |
| | | | 52/79.1 |
| 2010/0318984 A1 | 12/2010 | Araki | |
| 2014/0227025 A1 | 8/2014 | Giveans | |

\* cited by examiner

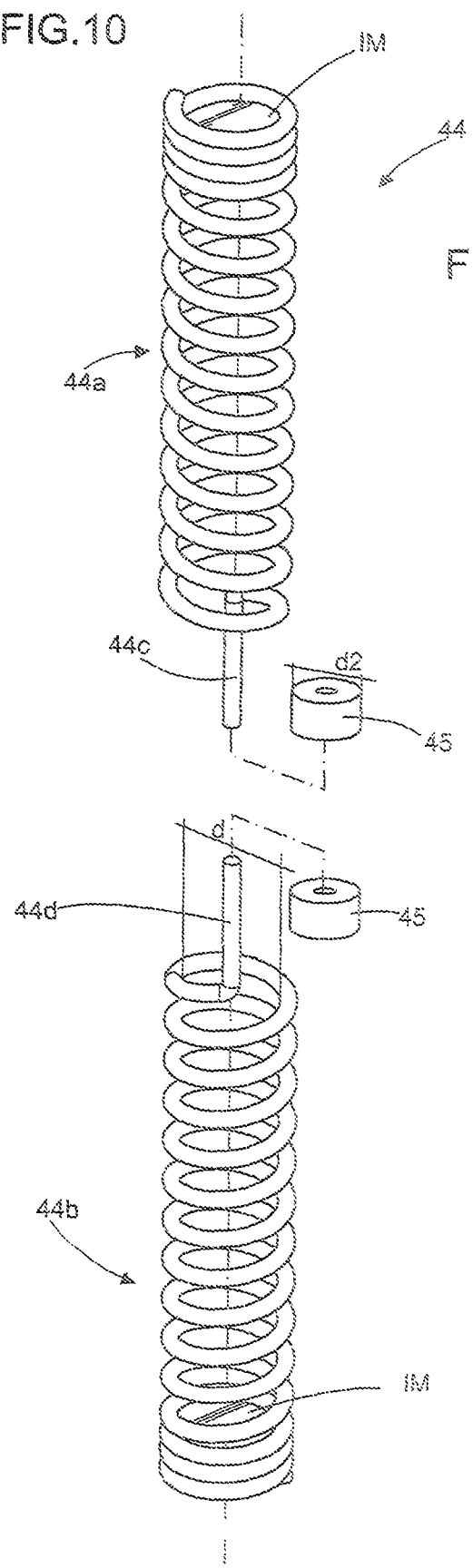
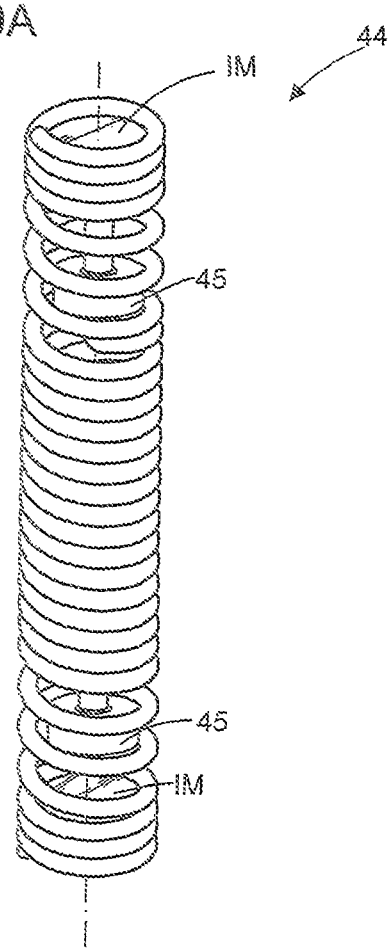
FIG.10
FIG.10A

FIG.12
FIG.12A
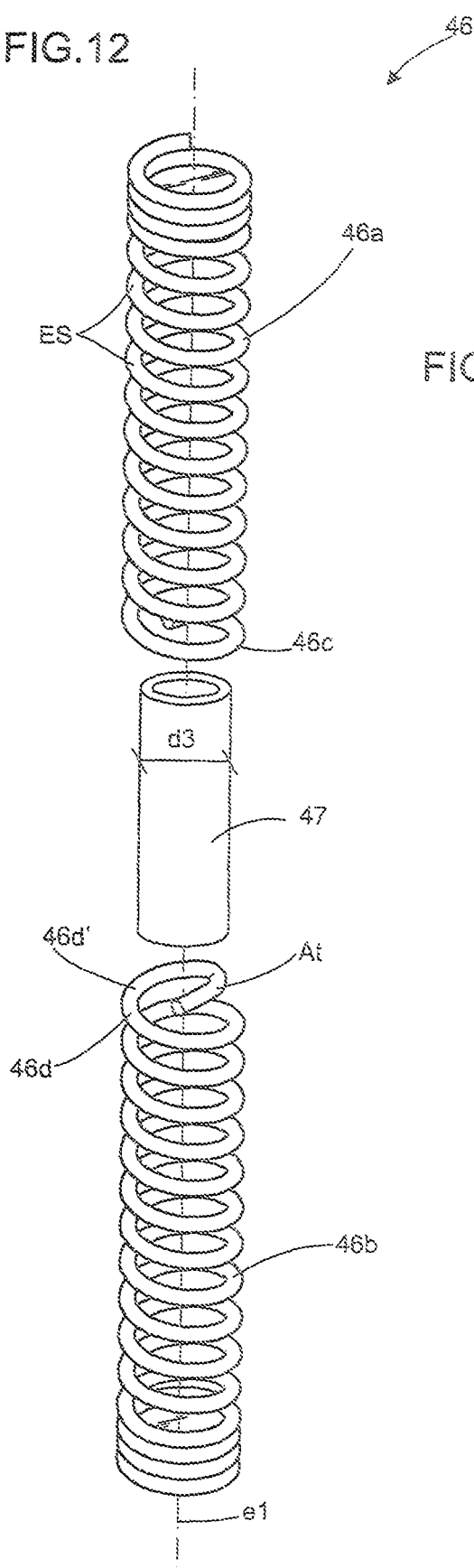
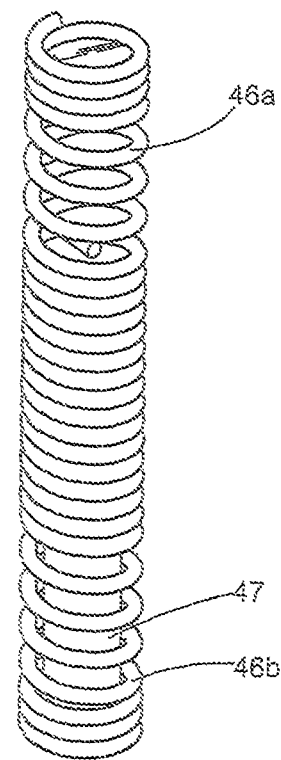

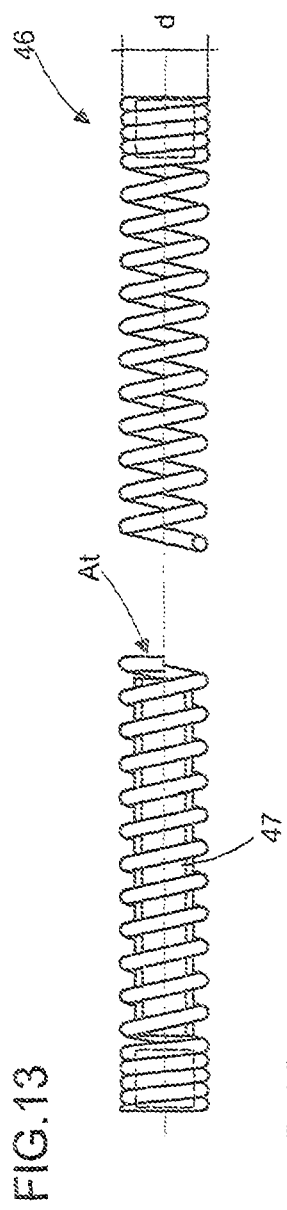
FIG.13
FIG.13A
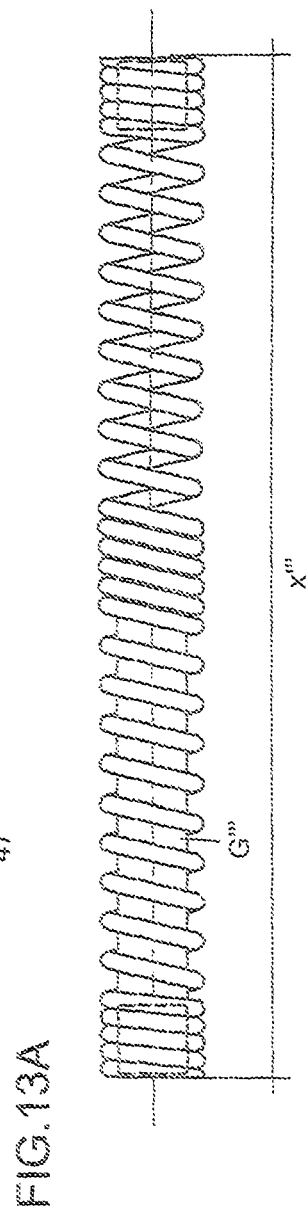
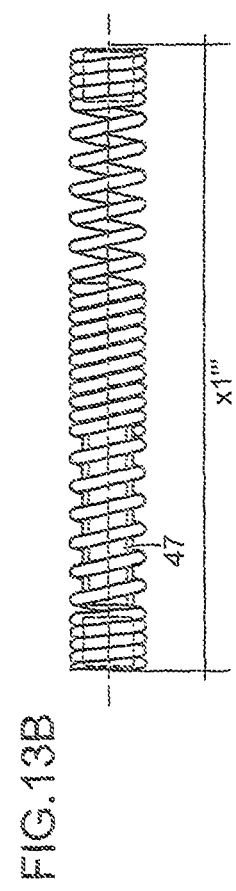
FIG.13B

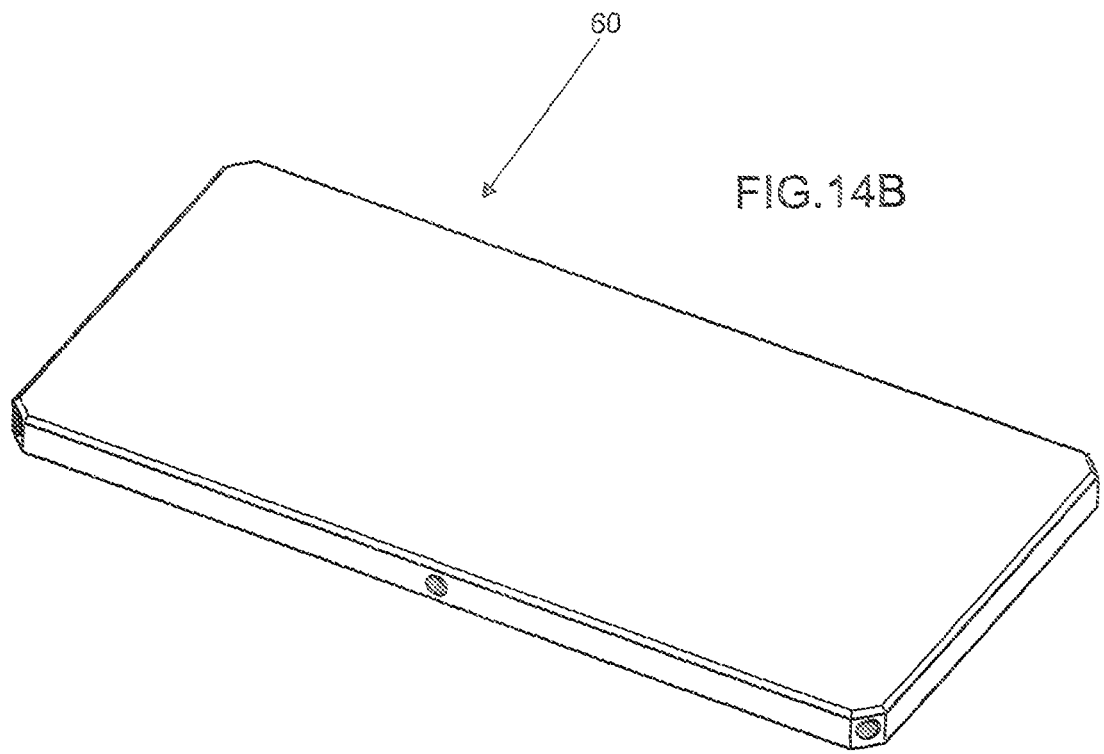
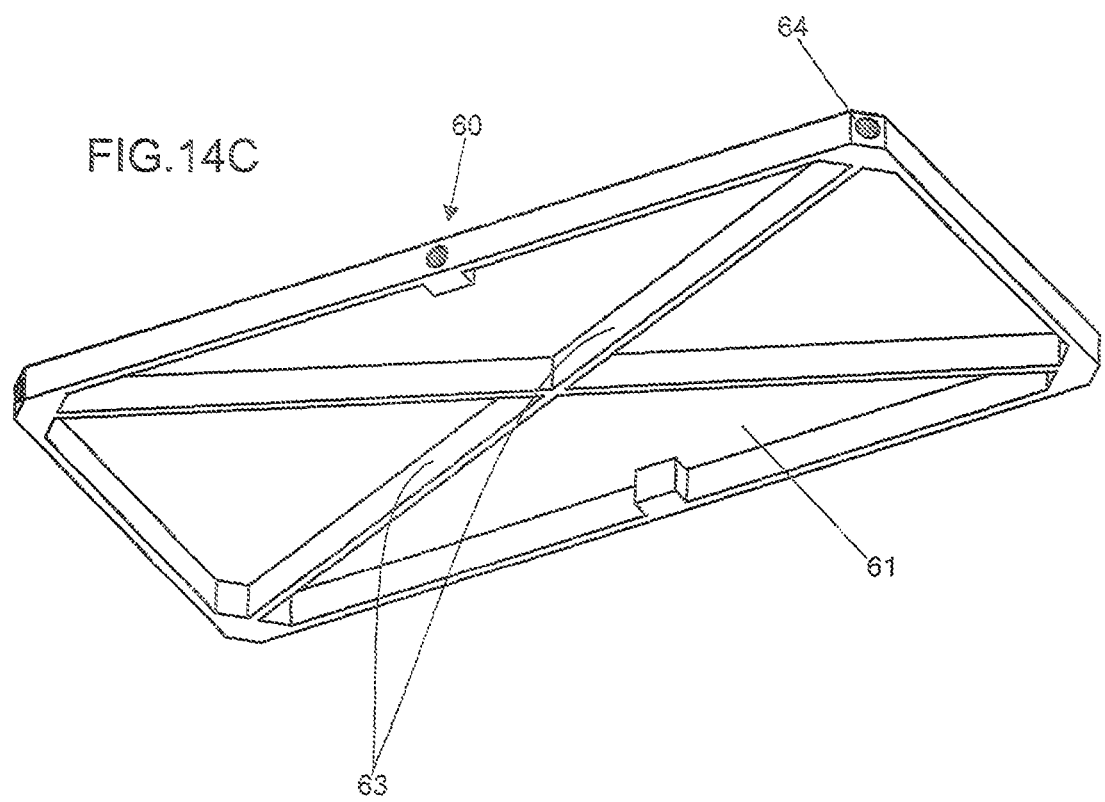

FIG.15
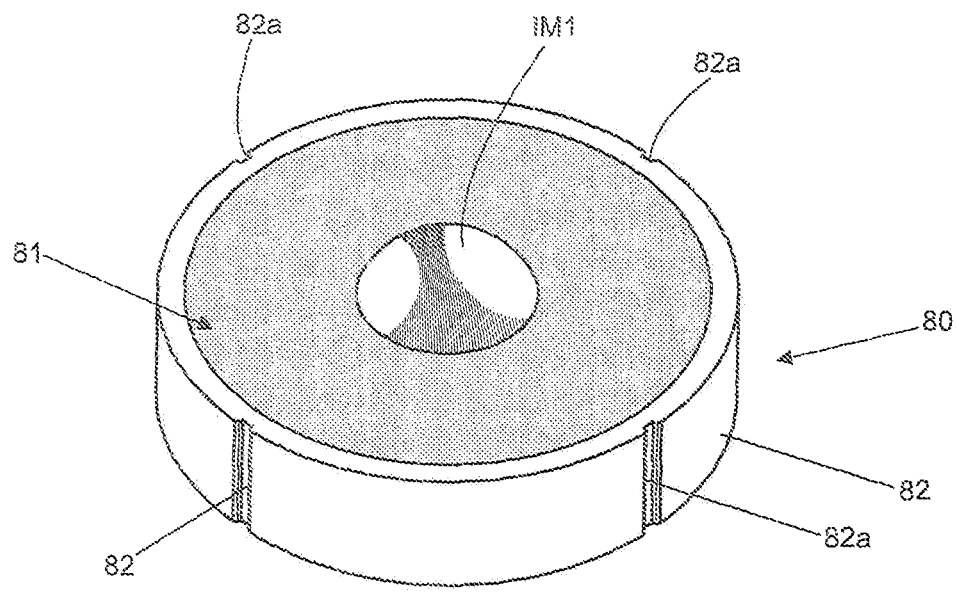
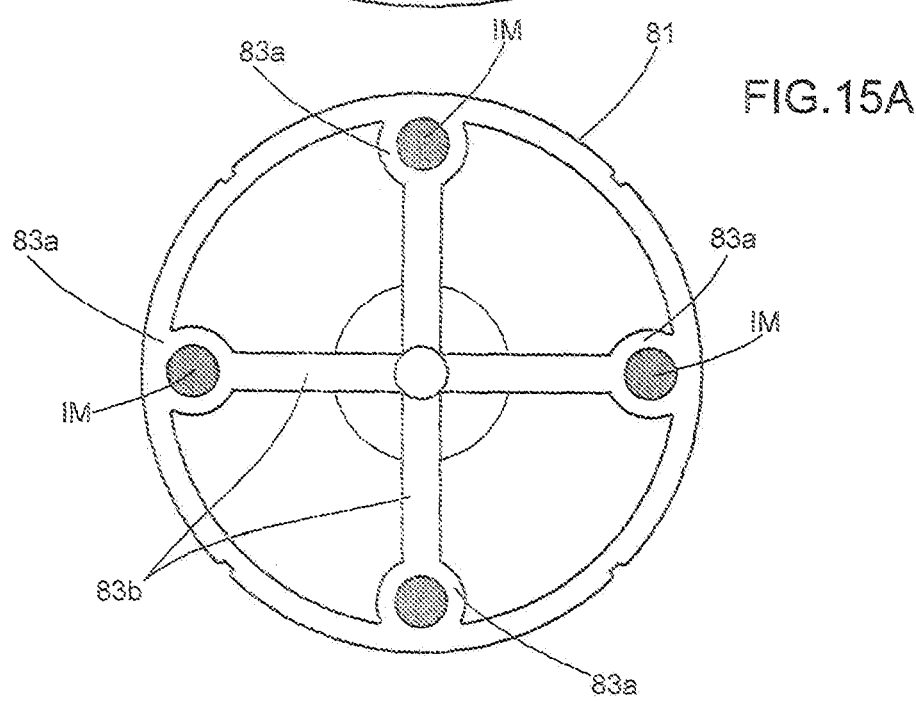
FIG.15A
FIG.15B

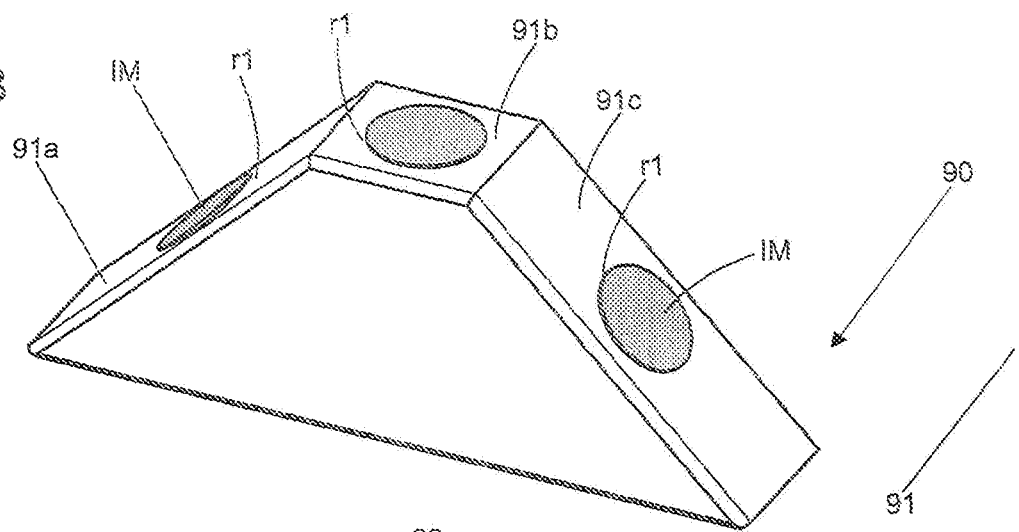
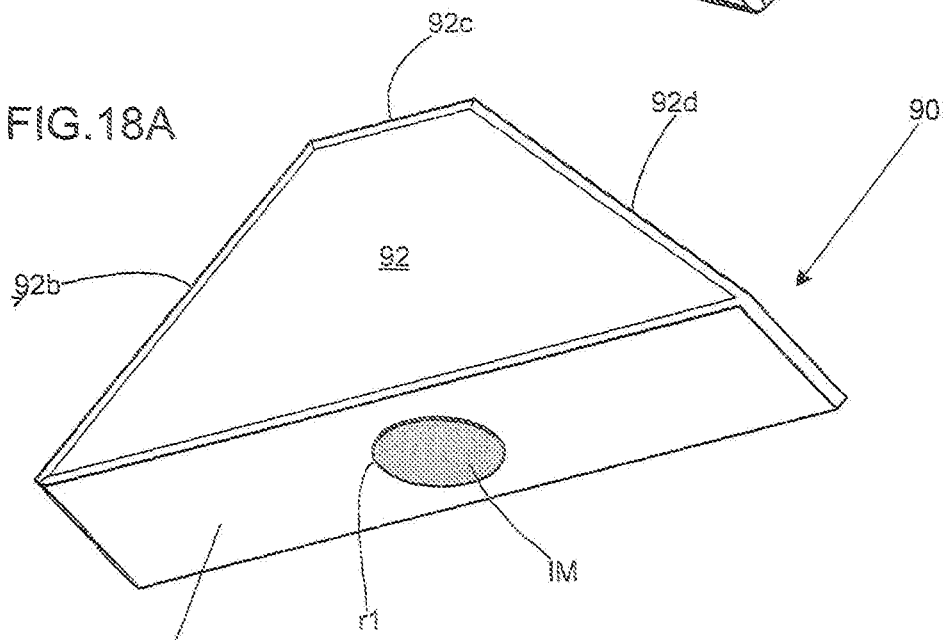
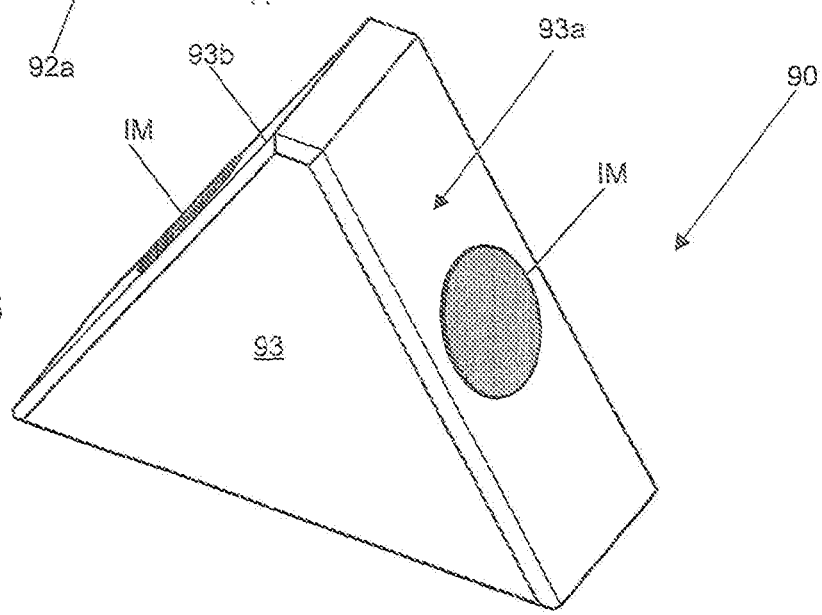

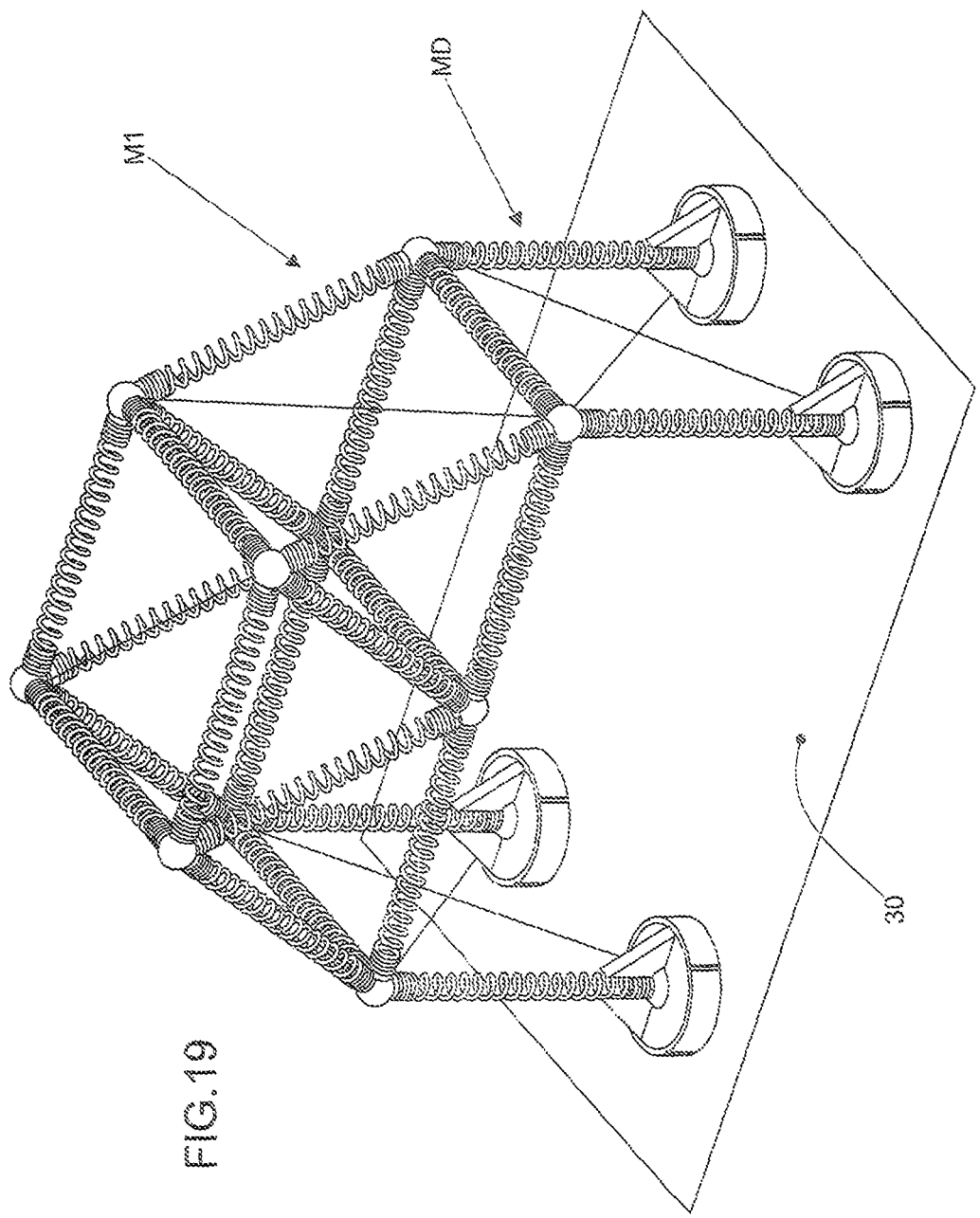

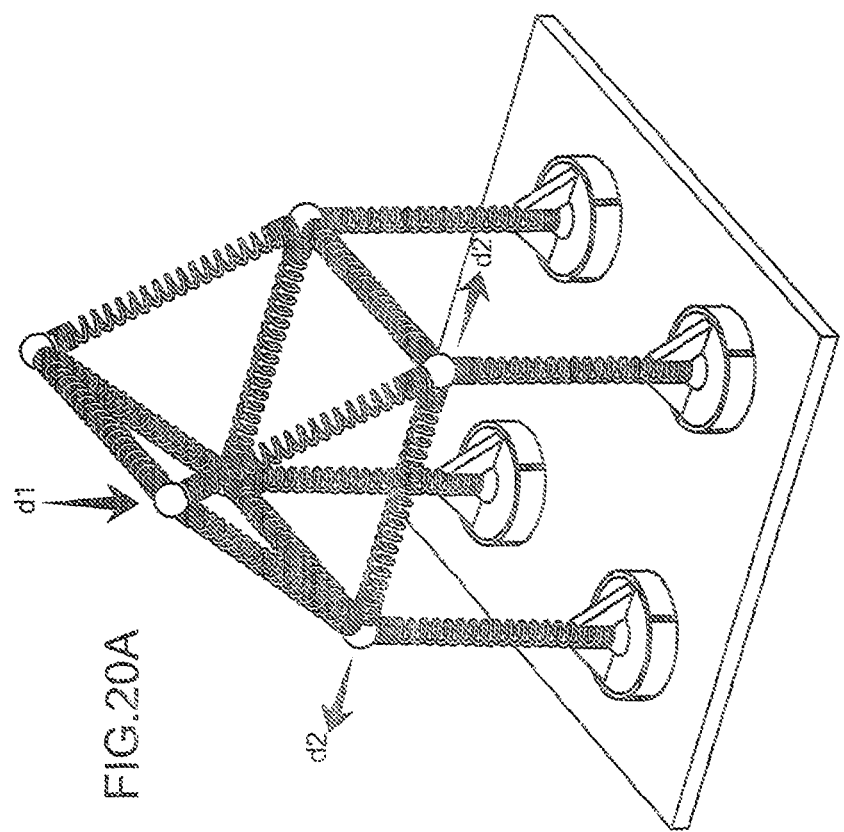
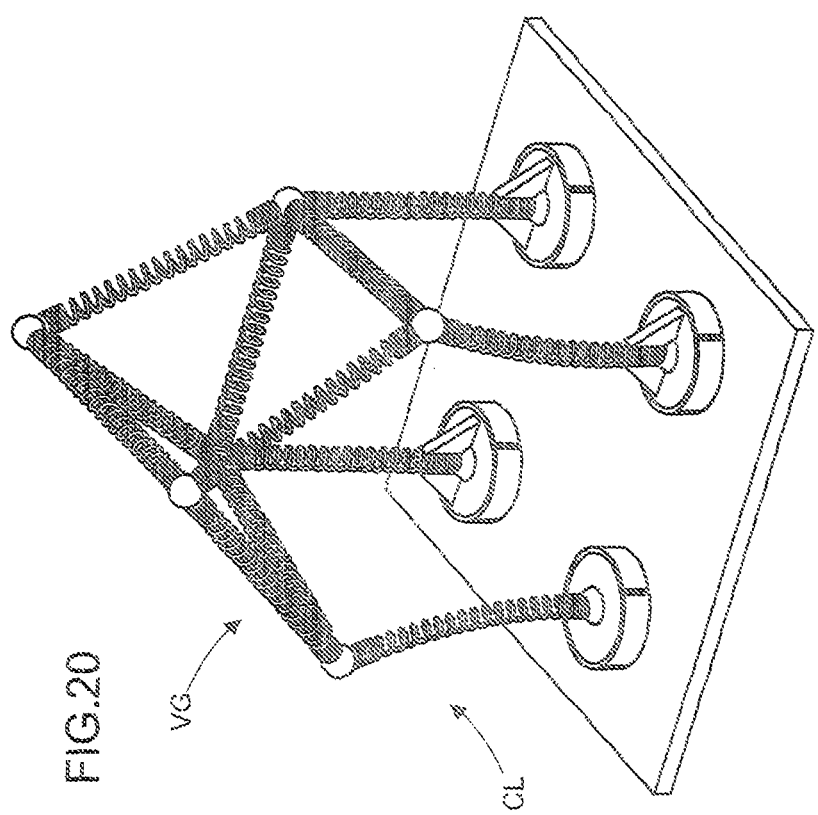

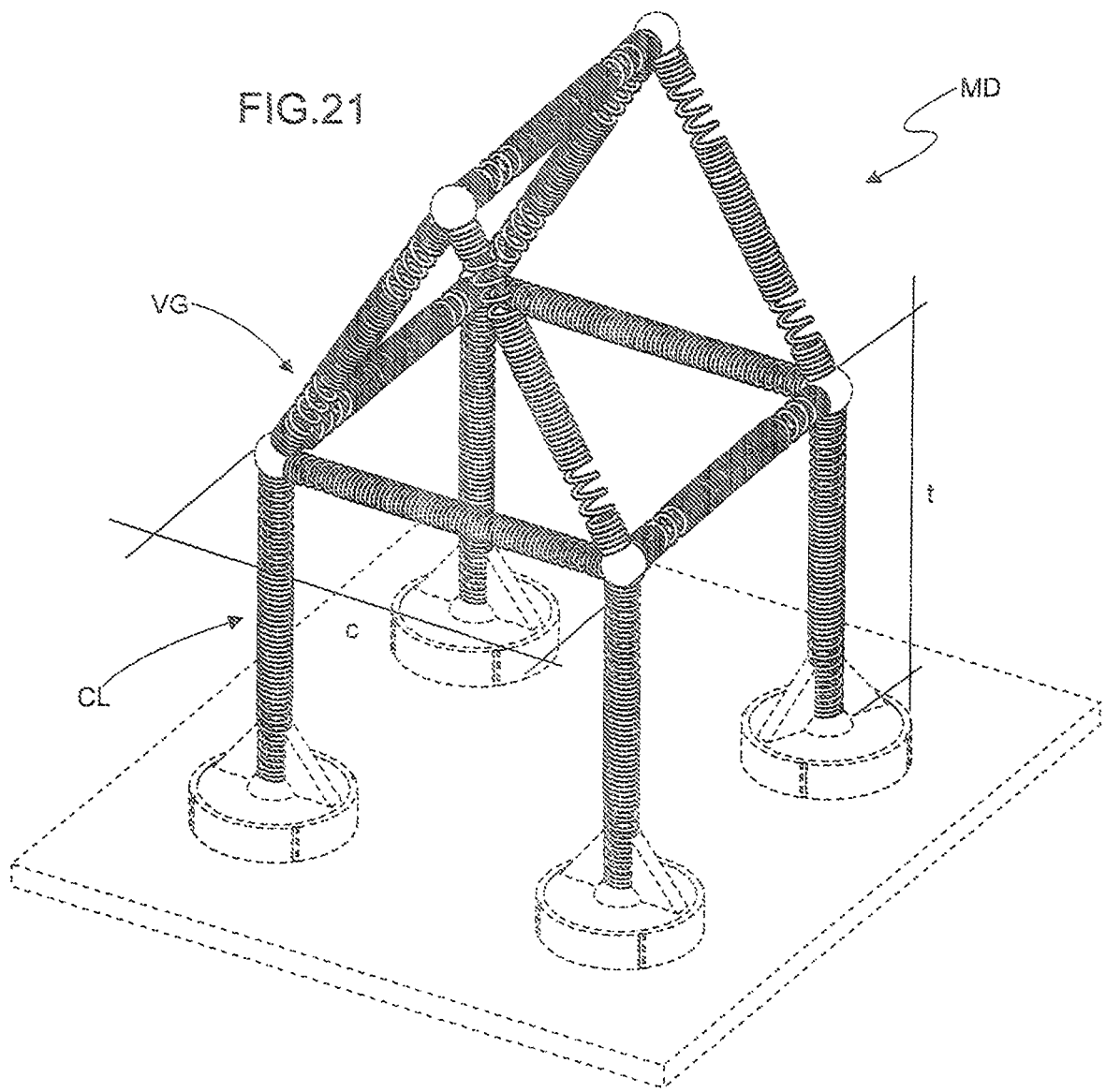

INTRODUCED IN SETS OF STRUCTURAL PARTS FOR COMPOSITION OF ARCHITECTURAL DIDACTIC MATERIALS

TECHNICAL FIELD OF INVENTION

The invention relates to the improvements introduced in sets of structural parts for the composition of architectural mockups where these sets of parts are particularly in the form of "kit" packaged in a compact box that includes a manual booklet with examples of structures mounted through the arrangement of the structural parts that help in the composition of idealized mockups for the simulation of the behavior of architectural structures in order to allow the visual and tactile interaction of displacements and deformations along the structure, making its behavior more comprehensible during learning or research performed by students, teachers, engineers, architects or any other person interested in the subject.

BACKGROUND OF THE INVENTION

The discipline of the study of structures, especially in architecture and civil engineering courses, is of great importance in the education of professionals.

This discipline provides the theory related to the actions and safety in the structures and respective standards, study of simple and compound parts, strength analysis, cross-sectional sections and dimensions, buckling, among other materials and, especially, the analysis of stresses to know the geometric imperfections, elastic analysis versus plastic analysis, braced and unbraced frames, etc.

The teaching methodology of the disciplines of structures currently provided by the teaching institutions is based on theoretical concepts with predominantly quantitative classes, making it extremely abstract.

Therefore, the static methodology for the presentation of the concepts related to the aspects of stresses in relation to the displacement and deformation behaviors of a structures hinders the demonstration by the teacher and, consequently, complicates the learning of students.

This learning deficiency generates a gap in the education of the professional, which even after graduating shows lack of information mostly on the basic concepts of the subject.

Therefore, some institutions present as an alternative the application in class activities for the elaboration of architectural mockups that enables the representation of the physical phenomena of the structures.

Despite the mockups enabling the experimentation and visualization of the deformed configuration for the demonstration of the concepts addressed in class, the assembly of different mockups require the use of several types of materials like duplex or triplex paper, balsa wood, MDF wood or other types of suitable materials, making the class expensive.

Another inconvenience lies in the fact that the programming time for teaching the concepts of the aforementioned discipline is short, hindering the construction of the mockups in classes to show the stresses in the architectural structure, impeding the visual demonstration of all the concepts.

To try and solve these problems, there are currently a number of specific softwares developed for the elaboration of a 3D electronic mockup, which enables the development of a structure with various structural solutions in a single graphic environment.

This solution limits the student's knowledge, since the entire calculation of the stresses is performed by the software, and the student needs to have a suitable and prior notion of the structure in order to provide various parameters as well as technical and numerical information required by the program.

The applicant working in the area of development of architectural mockups is the applicant of document number MU 8602813-8, which refers to the single parts that allow the visualization, with the naked eyes, of the deformation and displacement of a mounted structure returning to its initial shape without the structural mockup for teaching architectural structures suffering any type of permanent deformation by the process. The structural mockup for teaching architectural structures of the aforementioned application shows the initial concept of the said application, since it shows the behavior of the structures through miniature models, allowing, through experiments, the understanding of basic concepts of structural behavior through the qualitative side of the physical phenomenon. The structural mockup for teaching architectural structures consists of metal springs, metal cables, mockup paper, magnets, metal balls and metal plates.

PRIOR ART

Researches performed in specialized databases found documents referring to mockups, such as document number PI 0303779-7 that refers to the pedagogic mockup consisting of a wooden base on which the plates that show the built site is placed, and the site consists of parts of different shapes. Over the plates of the built site are placed plates that show the natural site, also consisting of multiple parts similar to those located on the lower part, consisting of the built site.

Document US2010318974 refers to elements that simulate a structure and provide a stable testing environment. Testing data is provided within the simulated structural environment to enable consistency and accuracy in testing.

The documents mentioned in the paragraph above, despite belonging to the same field of application, i.e., structural mockups, do not present any of the characteristics of the improved object, thus ensuring that it satisfies the legal requirements of patentability.

BRIEF DESCRIPTION OF THE INVENTION

The applicant, after long studies, presents a new set of structural parts equipped with interconnection means, which are associated to those already presented in the previous documents, as well as other elements that make up a "kit", duly organized to enable the composition of various architectural mockups that facilitate learning of the concepts proposed in class through visual and tactile contact experiments.

These improvements enable the set of parts in the form of "kits" to be mounted in a compact compartment, for example, in a rectangular box with a hinged lid of dimensions similar to that of a book, which is easy to carry and store the parts. Together with the sets of structural parts, the 'kit' is supplied with an instruction manual containing illustrations of some of the possible structures obtained with the arrangement of the structural parts contained in the 'kit'.

As already shown in document MU 8602813-8, the structural parts make analogy to civil construction structures and consists of pillars, beams, slabs, braces and foundations that reproduce the shape and behavior of a structure, and particularly enables the possibility of suffering deformations and dislocations for visual analysis of the behavior, and the reproduction of the deformations and displacements of the mockups occur due to the fact that some pillar and beam elements are formed by segments of metal springs.

Another structural part also shown in document MU 8602813-8 consists of the slab provided with the rigid plate, which is made of foam board for the horizontal locking of structures.

The improvements on the structural parts show structural vertical and cross-sectional elements that comprise beams and pillars formed by units of adjustable bars idealized for length adjustment to collaborate with the dimensional variations in the mounting of the architectural mockups, consisting of a pair of segments of metal helical springs of similar or different lengths, as well as varied coil diameters.

The stresses and deformations visually noticed on these springs reproduce the deformations and displacements of pillars and beams shown on the architectural mockups, enabling the visual analysis of the behavior as already presented in the aforementioned document MU 8602813-8.

Each segment of spring has coil pitches sized to enable the interlock between the segments of springs during the adjustment of the adjustable bar, as well as a deformed free end configuring the middle of the corresponding coupling means, and the ends opposite the coupling means receive units of magnets idealized to join the other elements like the labeled connections.

Therefore, to couple the springs, the deformed ends are coupled together, while to reduce the length the user simply telescopically thread the free ends of both segments of springs until the bar reaches the desired length.

The opposite effect, i.e, the increase in length is formed by telescopically unthreading both springs on the same longitudinal axis to increase the length of the structural bar.

The improvements on the structural parts also show the following on the sets of connections: a) base connections; b) continuous connections; c) sets of rigid connections. These connections also show as means of interconnection magnets housed in recesses in at least one of the flat sides of the parts that make up the set of connections.

The complete 'kit' also contains a metal plate that simulates the ground where the structures will be built, enabling the connection with the structural parts through interconnection means, particularly formed by the magnetism of the magnets.

Therefore, this 'kit' enables the joining of the structural parts already shown in document MU 8602813-8 including new elements that make up a new additional resource that can be used together with the traditional teaching methods, as well as serve as a new research path, not only for architecture students, but also engineering students and professionals of the field.

The use of the mockup allows the student to analyze the functioning of the structures without first being introduced to the technical concepts and later report the observations obtained in the mockup tests with theoretical knowledge in calculation.

Another advantage lies in the fact that the structural parts that connect with one another enable several combinations to obtain different arrangements of architectural mockups.

Another advantage lies in the fact that the composition of the adjustable bar by a pair of segment of springs that can be interlocked and coupled together facilitates the adjustment of the length for the composition of beams or pillars of architectural mockups in general.

Another advantage lies in the fact the constructive simplicity of the adjustable bar enables the manipulation by any student or teacher, promoting participation during the didactic instruction.

DESCRIPTION OF DRAWINGS

To complement this description in order to obtain a better understanding of the characteristics of the present invention and according to a preferential practical execution of the invention, a set of drawings is attached to the description, where its functioning process is represented in a simplified but not limiting way:

FIGS. 6 and 6A represent the exploded and mounted perspective views of the structural elements in the form of segment of springs in a first constructive version for the composition of the adjustable bar;

FIG. 7A shows the side views of the segments of springs coupled together, illustrating the longer extension of the adjustable bar;

FIG. 7B illustrates a side view of the segments of springs coupled together, illustrating an intermediate extension of the adjustable bar;

FIGS. 10 and 10A represent the exploded and mounted perspective views of the segment of springs in a third constructive version for the composition of the adjustable bar;

FIGS. 12 and 12A represent the exploded and mounted perspective views of segment of springs in a fourth constructive version for the composition of the adjustable bar;

FIG. 13 shows side views of the decoupled segments of springs;

FIG. 13A shows side views of the segments of springs coupled together, illustrating the longer extension of the adjustable bar;

FIG. 13B illustrates side views of the segments of springs coupled together, illustrating an intermediate extension of the adjustable bar;

FIGS. 14, 14A, 14B and 14C show the top and bottom perspective views of the plates that represent the slabs, walls and roofs on the architectural mockup;

FIGS. 15, 15A and 15B show the perspective, side and bottom views of the part that comprise the base connection that represents the foundations of a structure;

FIGS. 18, 18A and 18B show the perspective views of constructive versions of parts that comprise the rigid connection;

FIG. 19 shows a perspective view of a mockup obtained from the arrangement of the structural parts;

FIGS. 20 and 20A illustrate the perspective views of another mockup model, illustrating the deformation and maintenance; and FIG. 21 shows a perspective view of the application of the adjustable bar for the mounting of an architectural mockup.

DESCRIPTION OF THE INVENTION

Figure 2:
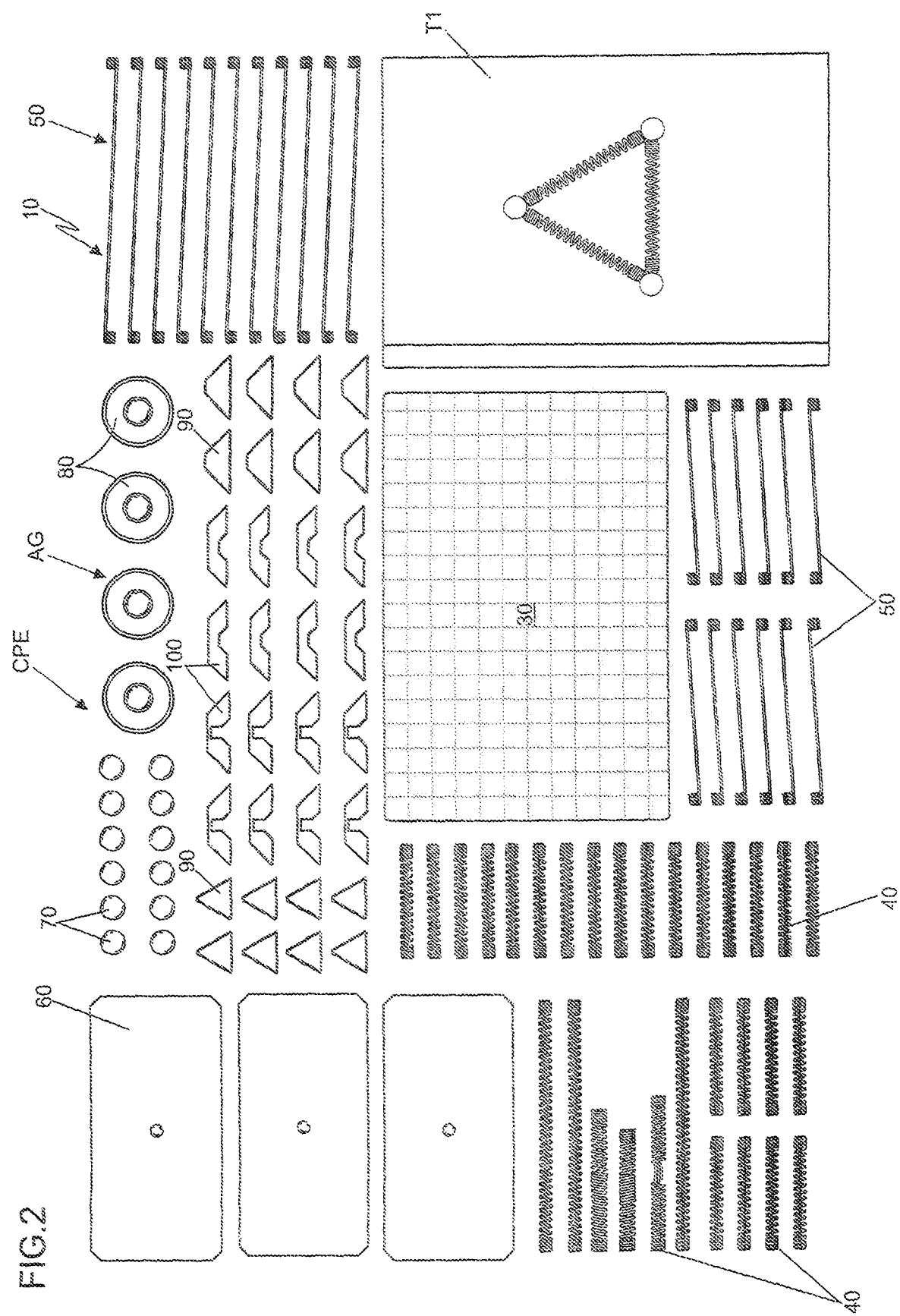
FIG. 2 shows a top view of the elements that may be part of the 'kit' in question.
Figure 3:
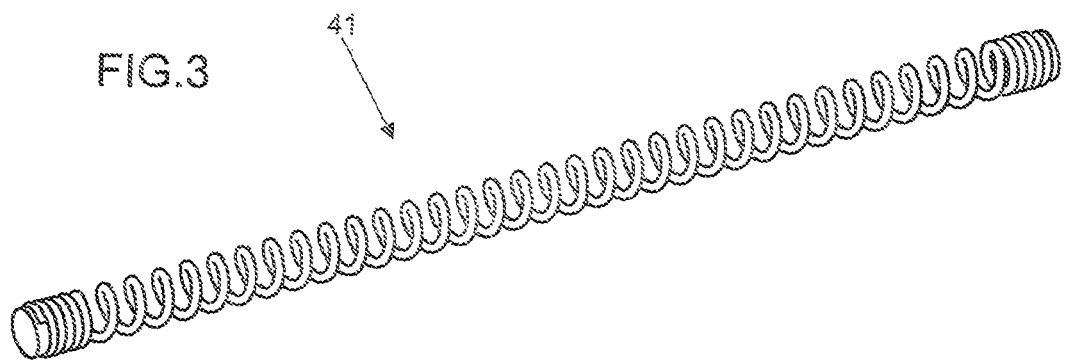
FIGS. 3, 4 and 5 show the perspective views of the cross-sectional and vertical structural elements, as well as the part that represents the bracings and tie rods.
Figure 4:
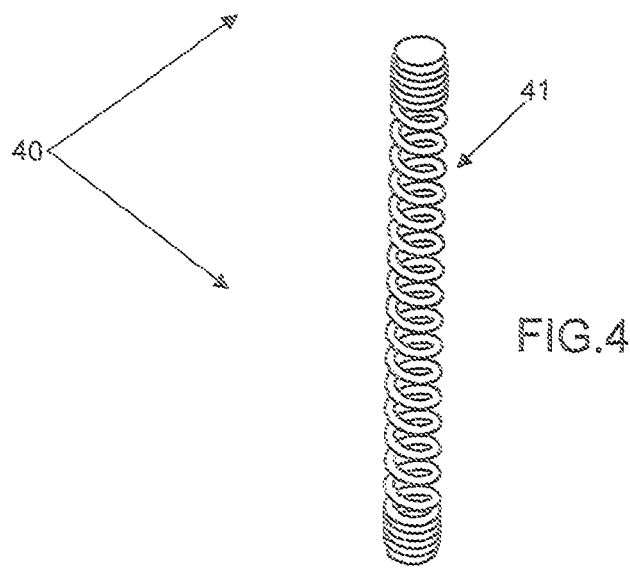
Figure 5:
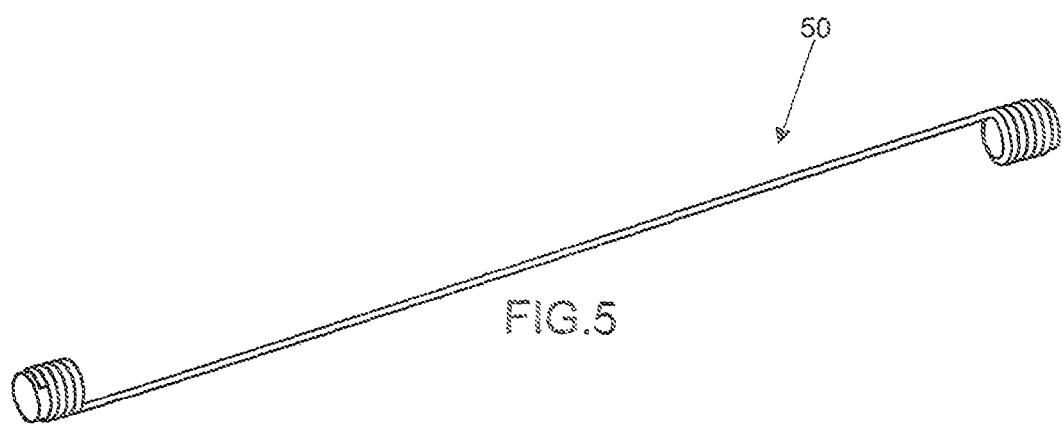

With reference to the illustrated drawings, this patent of invention refers to the "SETS OF STRUCTURAL PARTS FOR COMPOSITION OF ARCHITECTURAL DIDACTIC MATERIALS", more precisely refers to the set of structural parts (CPE) idealized for the composition of architectural mockups (MD) for learning or research performed by students, teachers, engineers, architects or any person interested in the subject. Each structural part (CPE) of the kit (10) has equivalence with the conventional parts used in civil construction for the approximate obtainment of the behavior of a real structure and the expected deformations (d1) or displacements (d2) (see FIGS. 20 and 20A), such as displaceable frame, non-displaceable frame, hypostatic structure, isostatic structure, hyperstatic structure, among others. Among the structural parts (CPE) is the metal plate (30) in different shapes, which simulates the ground where the structure will be built, enabling the connection of the base connections for the composition of the mockup (MD) (see FIG. 19) through the interconnection means (M1), particularly formed by the magnetism between cylindrical magnets (IM) housed in recesses (r1) or other suitable locations of the parts (CPE). Said parts (CPE) consist of vertical and cross-sectional structural elements (40) that make up pillars and beams and are formed by helical and cylindrical metal springs (41) whose visible deformations make up the deformations (d1) or displacements (d2) of the structures (MD); ii) metal cables (50) that make up the bracings and tie rods; iii) plates (60) that simulate slabs, walls and roofs made in plastic for the horizontal, vertical or inclined locking between the elements (40) and (50) to simulate the slabs, walls and roofs of a construction; and iv) groups of connections (AG), also made up of labeled connections (70) (see FIG. 2) that consist of hollow or solid metal balls (71) to receive the magnets (IM) of the elements (40) and (50) or other magnets (IM) of other structural parts (CPE) and rigid connections (90) formed by trapezoidal parts (91) where at least three flat sides (91a), (91b) and (91c) have housings (r1) for mounting the magnets (IM).

Figure 1:
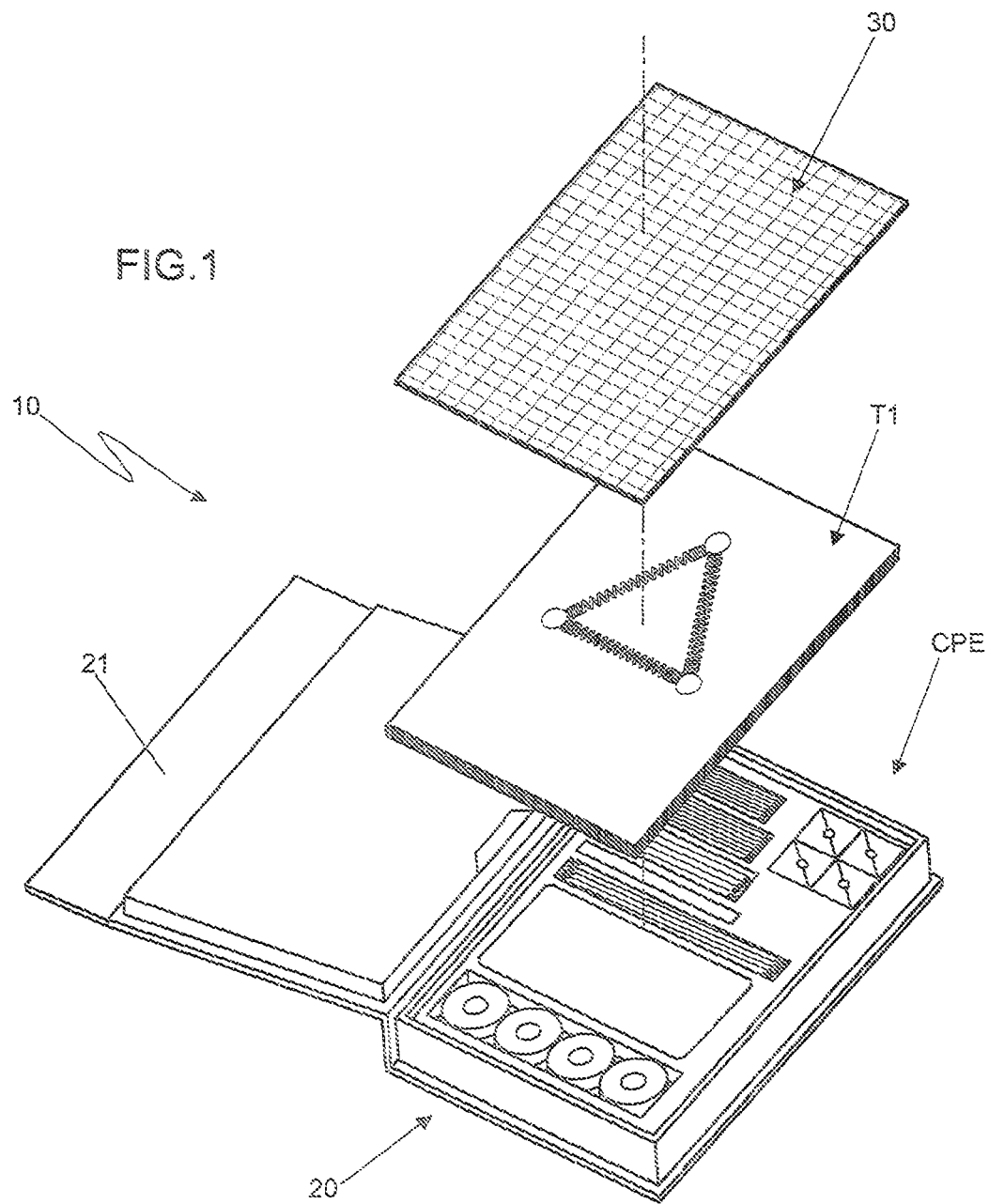
FIG. 1 shows a perspective view of the 'kit' in question, illustrating the exploded view of the package holding the set of structural parts, as well as the manual booklet and support plate.

According to the present invention, the group of parts (CPE) (30), (40), (50), (60) and (70) and the inclusion of parts of the base connections (80), rigid connections (90) and continuous connections (100) make up a 'kit' (10) (see FIG. 1) mounted in a compact rectangular box (20) with hinged lid (21), and the kit (10) includes an instruction manual (T1) containing illustrations of possible structures obtained with the arrangement of the structural parts (CPE).

In a preferential constructive version, the vertical and cross-sectional structural elements (40) made up of springs (41) can be constituted by units of adjustable bars (42) idealized to enable the length adjustment or reduction (x)/(x1) for the compositions of variations of lengths (c) or heights (t) of beams (VG) or columns (CL) during the mounting of the architectural mockups (MD) (see FIG. 21), where the said units of adjustable bars (42) consist of a pair of segments of metal springs (42a) and (42b) of the helical type with pitches (p) of coils (ES) sized for threading between the segments of springs (42a)/(42b) during the adjustment of the adjustable bar (42). Each segment of spring (42a)/(42b) has a coupling means (MG) made of deformities (DO made on one of the free ends (42c) and (42d) of the segments of springs (42a)/(42b), while the opposite ends (42e) and (420 receive units of magnets (IM) idealized to join the other elements for the composition of the architectural mockups (MD).

The extension adjustment or reduction (x)/(x1) consists of the coupling between the deformed ends (42c) and (42d) and longitudinal threading or unthreading of the pitches (p) between the segments of springs (42a)/(42b) until the bar (42) reaches the desired length (c) or height (t).

Each individual segment of spring (42a) and (42b) may have identical (c) or different (c1) lengths between them.

Figure 6:
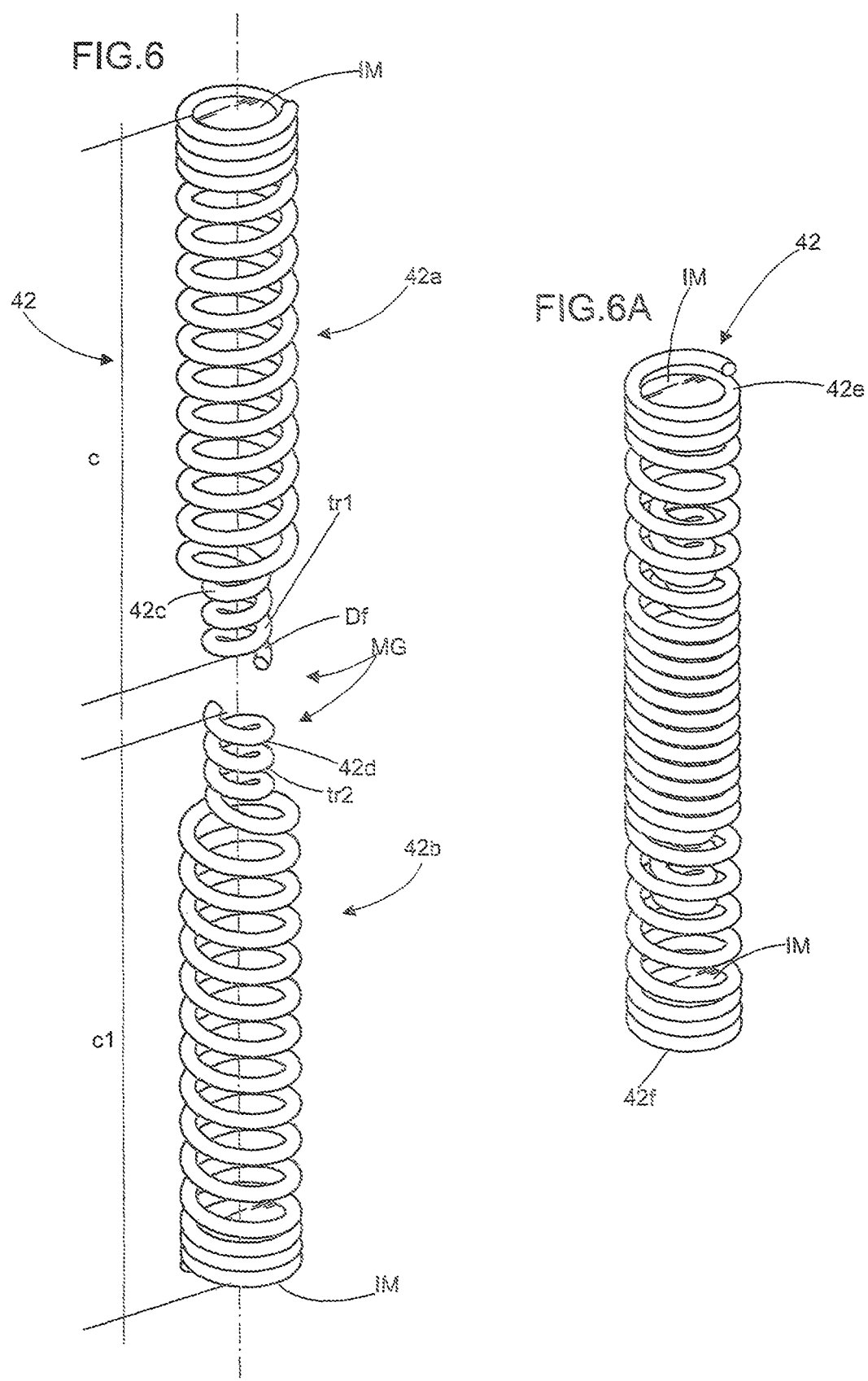
Figure 7:
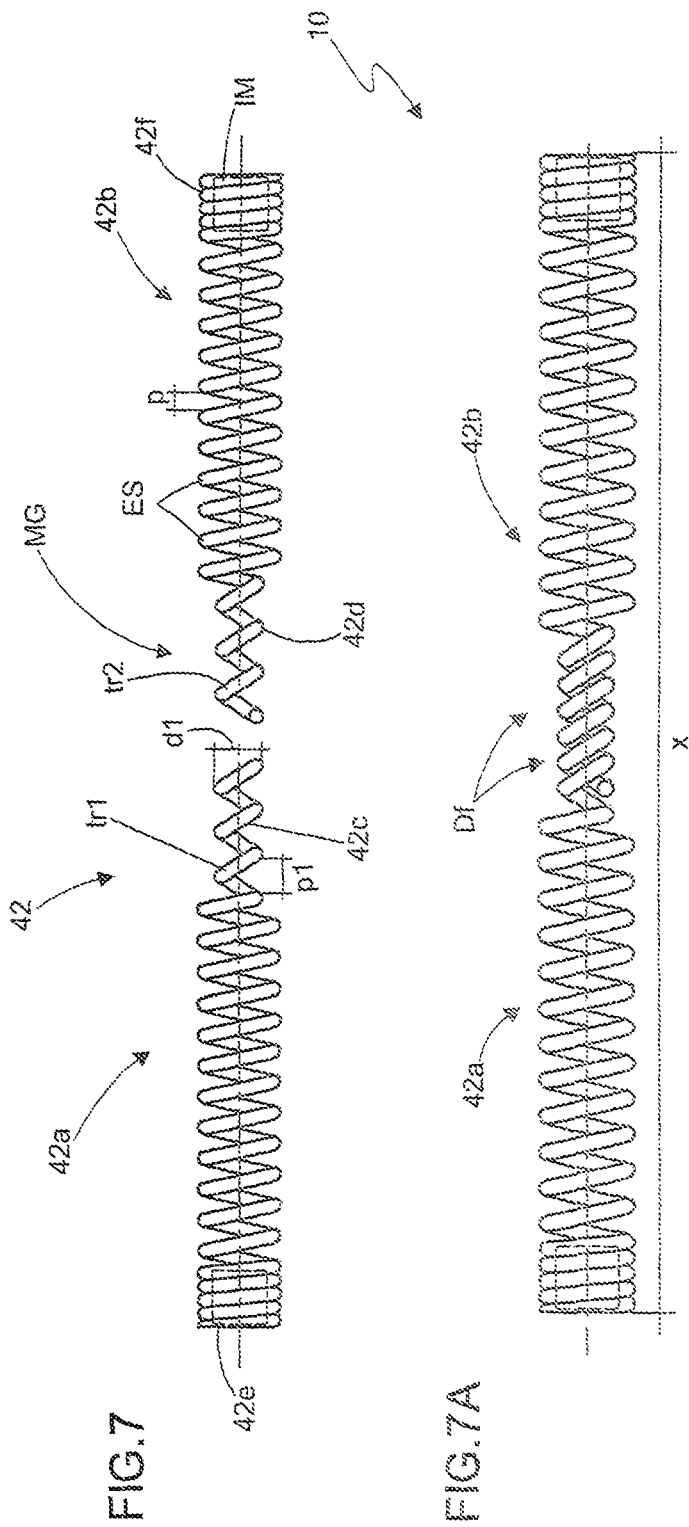
FIG. 7 shows side views of the decoupled segments of springs.

In a first constructive version, (see FIGS. 6 to 7B), the adjustable bar (42) consists of segments of springs (42a) and (42b) with circular section that fit through the deformed ends (42c) and (42d) to thread them together, intercalating respective coils (ES), with said deformed ends (42c)/(42d) corresponding and identical to one another, preferably constituted by parts (tr1)/(tr2) formed by diameter reductions (d1) and increased pitches (p1) in relation to the pitches (p) of the non-deformed parts that constitute the segments of springs (42a)/(42b). Said parts (42c)/(42d) of both segment of springs (42a)/(42b) fit together to form the concentricity between the parts.

For the reduction (x1) or extension (x) of the bar (42), simply thread or unthread the parts (42c)/(42d) in the pitches (p1) followed by threading/unthreading the pitches (p) of the non-deformed parts of the segments of springs (42a)/(42b).

Figure 8:
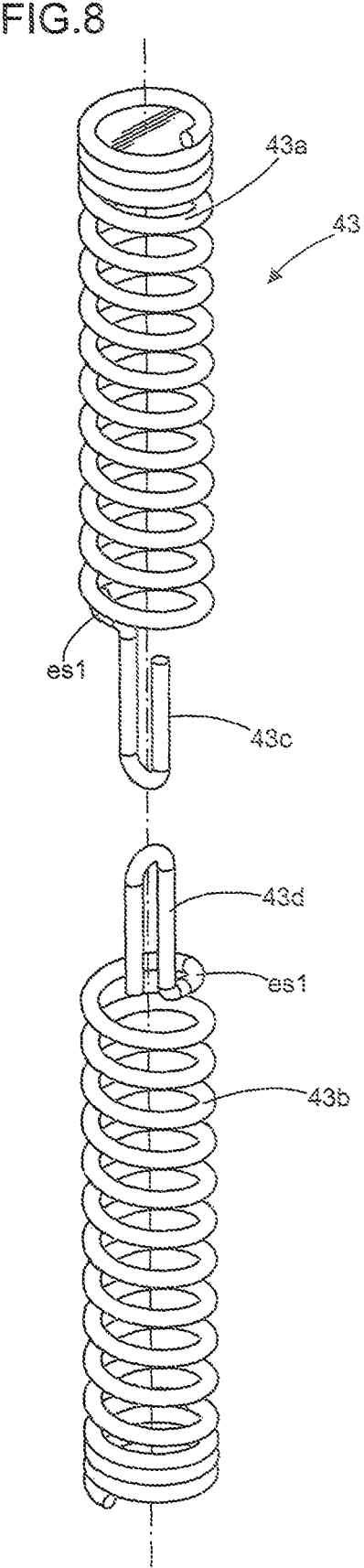
FIGS. 8 and 8A represent the exploded and mounted perspective views of segment of springs in a second constructive version for the composition of the adjustable bar.
Figure 8A:
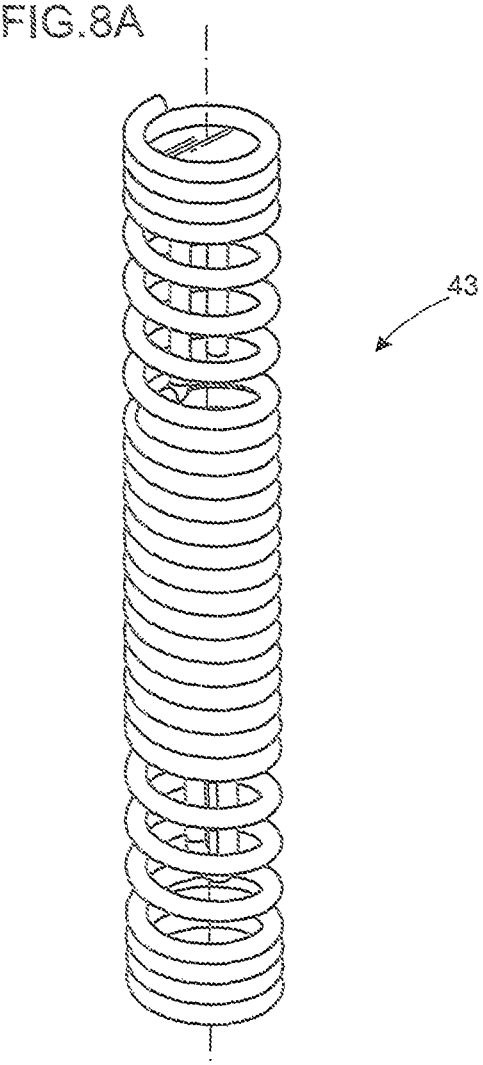
Figure 9:
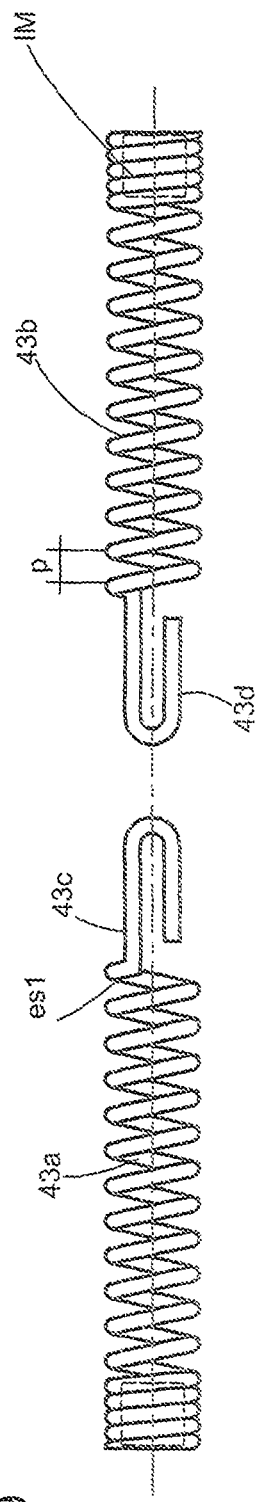
FIG. 9 shows side views of the segments of springs coupled together.
Figure 9A:
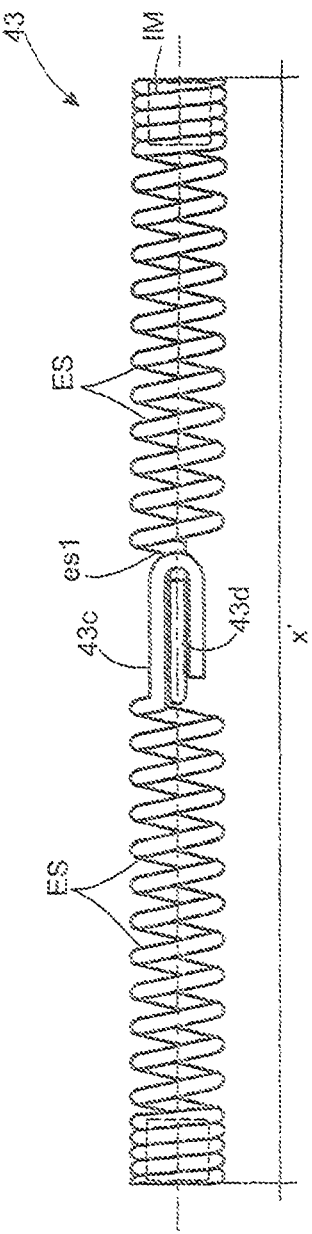
FIG. 9A shows side views of the segments of springs coupled together, illustrating the longer extension of the adjustable bar.
Figure 9B:
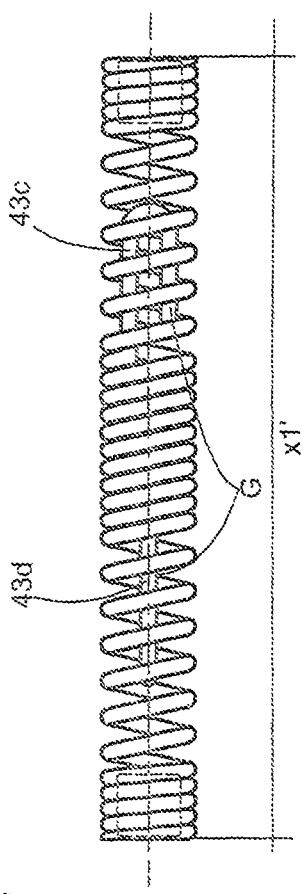
FIG. 9B illustrates a side view of the segments of springs coupled together, illustrating an intermediate extension of the adjustable bar.

In a second constructive version, (see FIGS. 8 to 9B), the adjustable bar (43) consists of segments of springs (43a)/(43b) of circular section with one of the free ends coupled together for threading between the coils (ES), and said ends are formed by extensions (43c)/(43d) of the farthest coil (es1) with 'hook' shape.

For the reduction (x1') or extension (x') of the bar (43), simply couple the hooks (43c)/(43d) and thread the pitches (p) of the coils (ES) where said hooks (43c)/(43d) constitute guides (G) for coupling between the segments of springs (43a)/(43b) keeping them concentric after threading.

Figure 11:
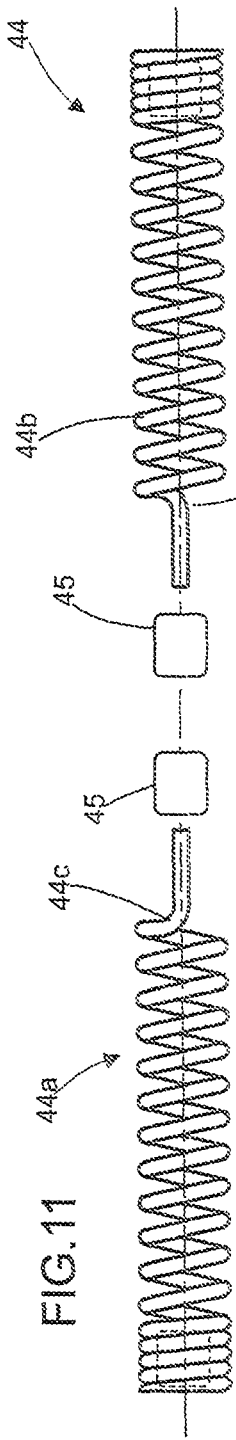
FIG. 11 shows side views of the decoupled segments of springs.
Figure 11A:
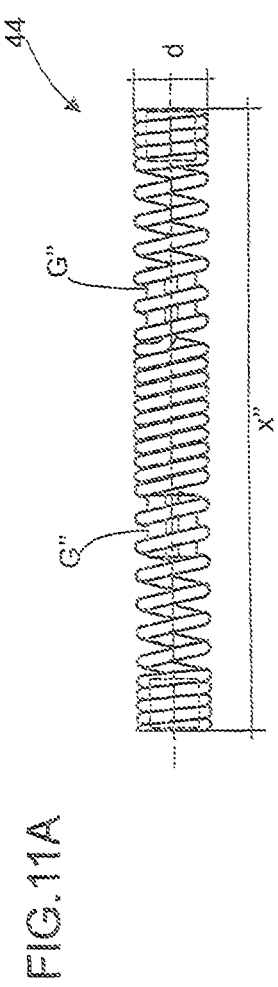
FIG. 11A shows side views of the segments of springs coupled together, illustrating an intermediate extension of the adjustable bar.
Figure 11B:
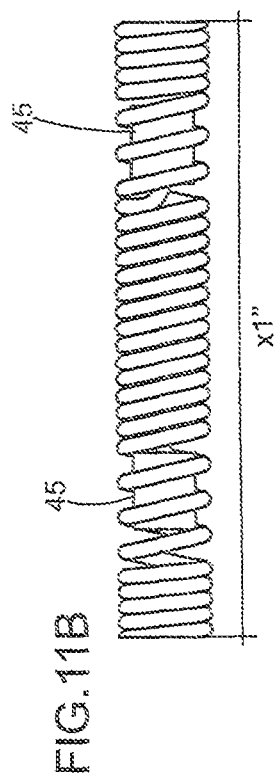
FIG. 11B illustrates side views of the segments of springs coupled together, illustrating the smaller extension of the adjustable bar.

In a third constructive version, (see FIGS. 10 to 11B), the adjustable bar (44) consists of segments of springs (44a)/(44b) with one of the ends formed by extended and straight parts (44c)/(44d), which in turn are coated with a tubular cover (45) with a diameter (d2) that is reduced in relation to the diameter (d) of the coils (ES).

Said cover (45) is made of resilient material, such as rubber, which in turn constitutes a guide (G") during threading of the segments of springs (44a)/(44b) to maintain the concentricity of the springs after threading during the reduction (x1") or extension (x").

In a fourth constructive variation, (see FIGS. 12 to 13B), the adjustable bar (46) consists of a pair of segments of springs (46a) and (46b) that fit together through one of their ends (46c)/(46d), allowing them to be threaded together, intercalating their coils (ES). The segment of spring (46a) receives a flexible hose (47) embedded along its length, made of resilient material like rubber or similar, of which the diameter (d3) is reduced in relation to the diameter (d) of the coils (ES). Said flexible hose (47) constitutes the guide (G"), with the purpose of keeping the springs (46a)/(46b) concentric after being threaded during reduction (x1") or extension (x").

The free end (46d') of the segment of spring (46b) is deformed with a short bend on the wire, towards the axis (e1) of the spring (46b) constituting a shield (At) for the flexible hose (47) to prevent its displacement.

Figure 14:
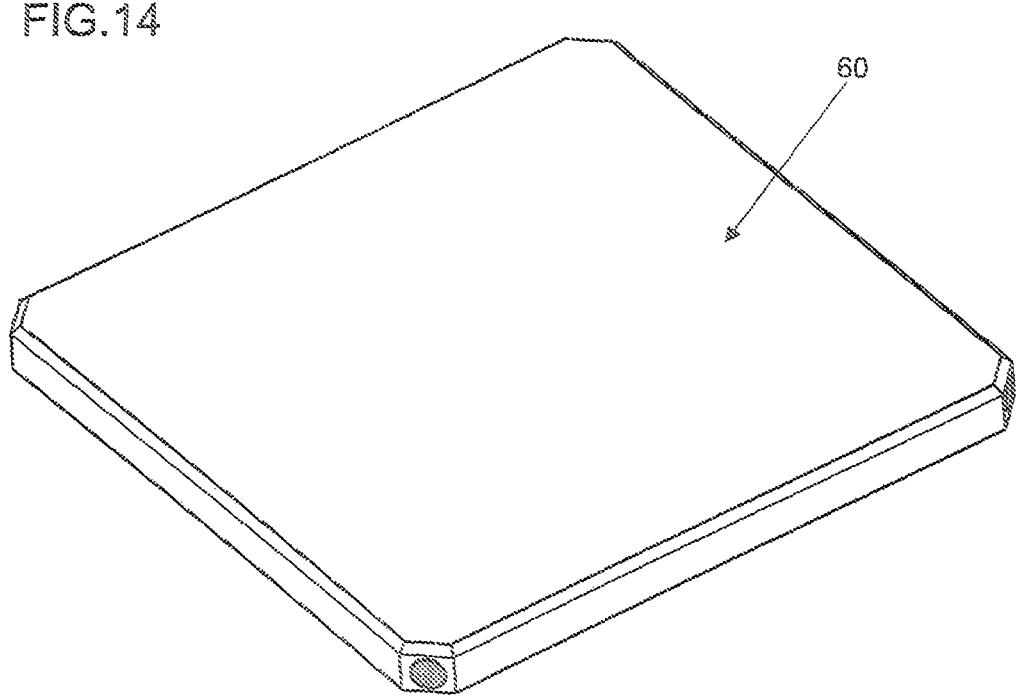
Figure 14A:
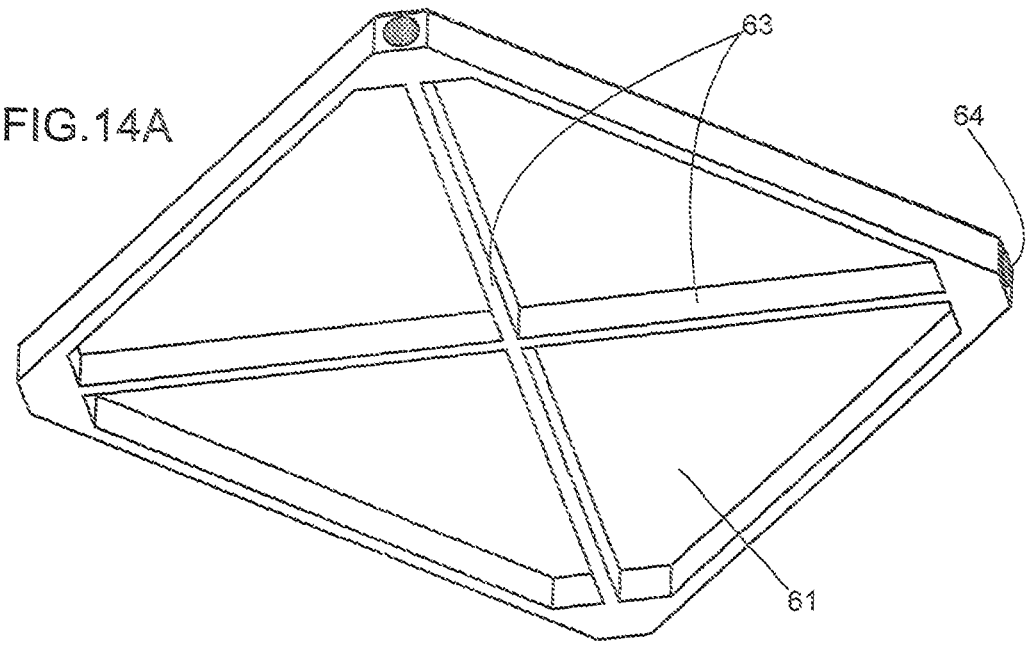

In a preferential constructive version, said plates (60) (see FIGS. 14 to 14C) have recesses on the lower side (61) where there are grooves (63) with "X" shape, and the free ends end on the sides of the chamfered edges (64).

Each base connection (80) (see FIGS. 15 to 15B) consists of a discoid plate (81) of short height and peripheral wall (82) equipped with multiple longitudinal recesses (82a), while the lower side (83) is recessed and has four ring areas (83a) interconnected by cross-sectional and longitudinal grooves (83b). Each ring area (83a) has a housing to hold the respective magnet (IM), while the side opposite the lower side (83) has a central recess to hold a steel ball.

In a second constructive version of the rigid connection (90), (see FIG. 18A) the part (92) has four peripheral sides (92a), (92b), (92c) and (92d) have housings (r1) for mounting the magnets (IM).

In a third constructive version, (see FIG. 18B) the rigid connection part (93) has a triangular shape with at least two opposite sides (93a) and (93b) with housings (r1) for mounting the magnets (IM).

Figure 16:
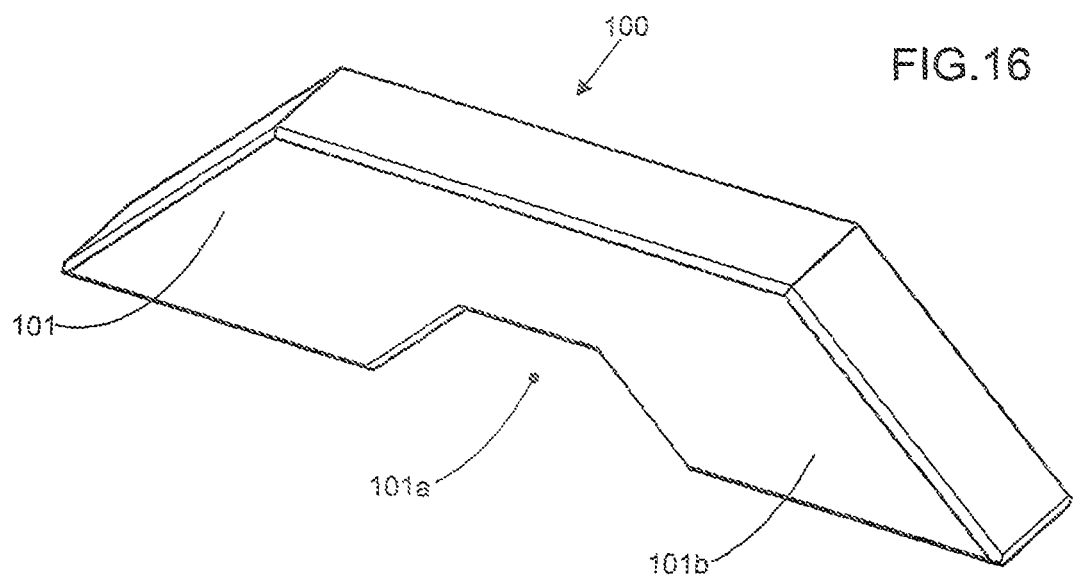
FIGS. 16 and 16A represent top and bottom perspective views of a constructive version of the continuous connection.
Figure 16A:
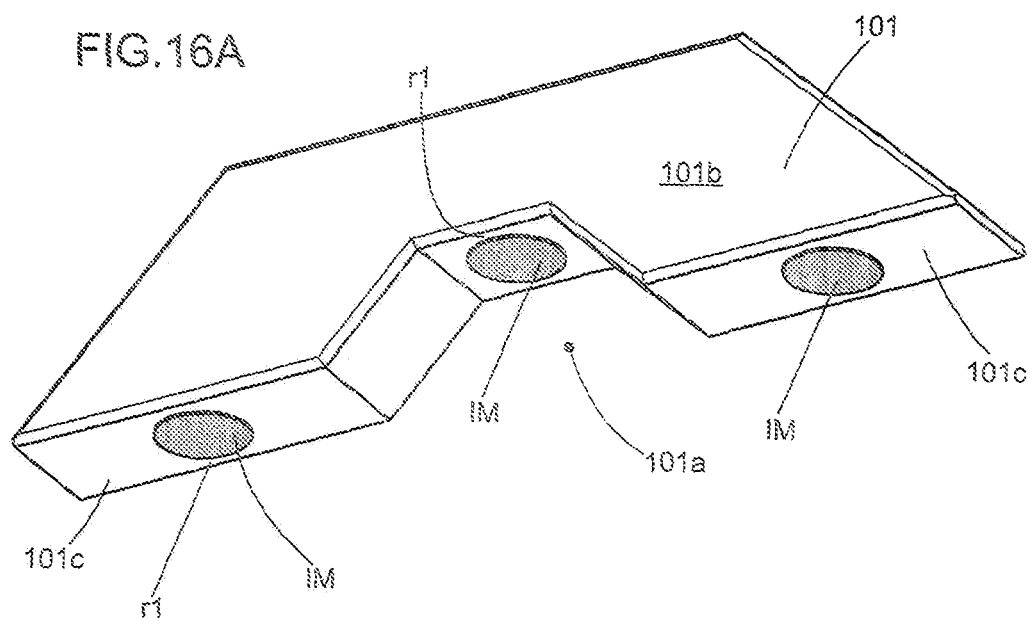

Completing the 'kit' in a preferential version, the set of continuous connections (100) consists of trapezoidal parts, and in a first version (see FIGS. 16 and 16A) said part (101) has a central cutout (101a) on the front wall (101b) that is also trapezoidal in shape, constituting a reentrant flat side with housing (r1) for mounting the magnet (IM), also located on the sides of the base (101c).

Figure 17:
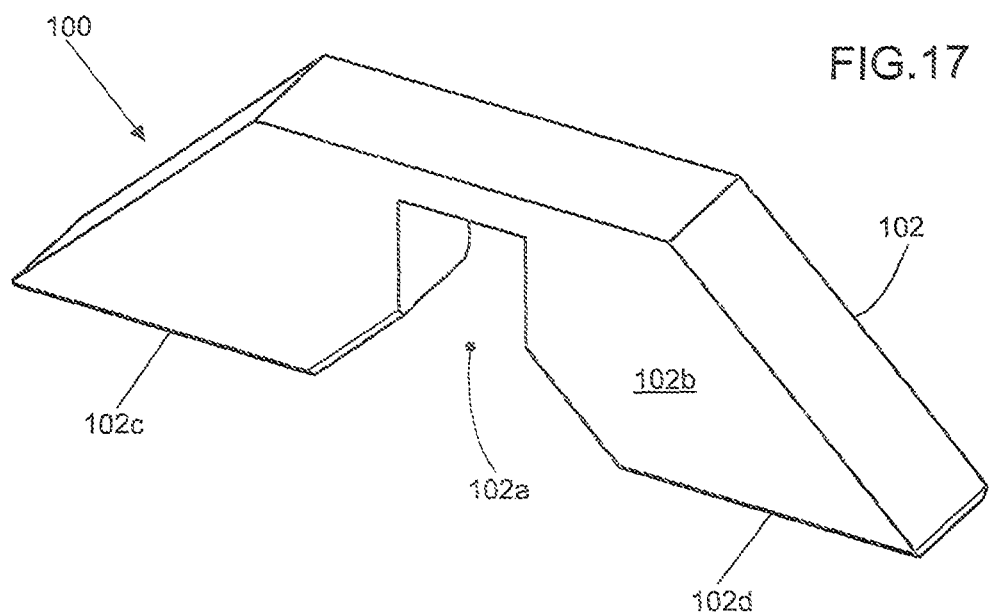
FIGS. 17 and 17A show top and bottom perspective views of a second constructive version of the continuous connection.
Figure 17A:
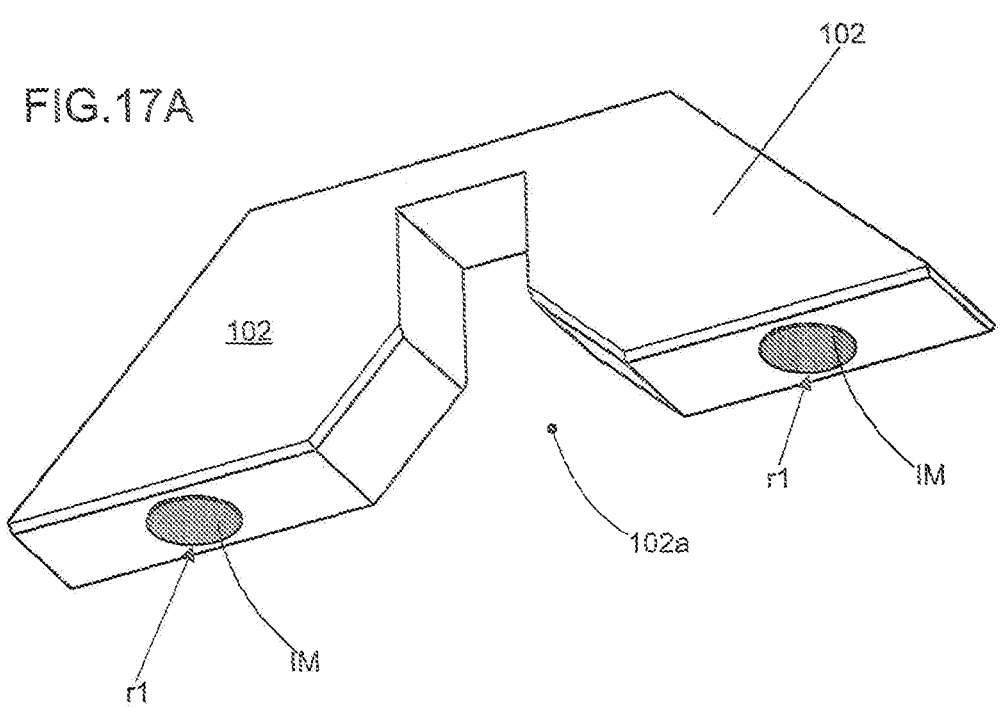

Another constructive version presented consists of a continuous connection (102) (see FIGS. 17 and 17A) constituted by a trapezoidal part with cutout (102a) on the front side (102b) in the shape of an inverted 'Y' to form the split base with flat sides (102c) and (102d), both with housings (r1) to insert the magnet (IM).

It is certain that when the present invention was put into practice, modifications related to certain construction and shape details can be introduced without implying in deviating from the fundamental principles that are clearly substantiated in the claim scope, thus being understood that the terminology used had no limiting purpose.

The invention claimed is:

1. An architectural mockups kit, having individual structural vertical and cross-sectional elements equivalents to conventional parts used in civil construction for approximate obtainment of behavior of a real structure and expected deformations or displacements; the architectural mockups kit comprising:

(1) a plurality of adjustable bars idealized for length adjustment, enabling mounting dimensional variations in the architectural mockups kit; each of the adjustable bars consisting of a pair of segments of cylindrically-shaped helical metal springs of similar or different lengths, and a plurality of coils of different diameters; each segment of the springs having coil pitches sized for enabling an interlock between the pair of segments of the springs during adjustment of the plurality of adjustable bars, through coupling means; and each segment of the springs having a deformed free end configuring the coupling means, and ends opposite to the coupling means having magnets enabling the springs to join other structural elements, wherein, the deformed free ends of the pair of segments of the springs are coupled together for coupling the springs; telescopically threading the deformed free ends of the pair of segments of the springs until the bar reaches a desired length, for reducing the length; or telescopically unthreading the pair of segments of the springs on a same longitudinal axis for increasing the length of the structural bar, enabling extension adjustment or reduction of the plurality of adjustable bars for a desired length or height, and wherein the plurality of adjustable bars are coupled to form beams and pillars;

(2) a plurality of connections, comprising: labeled connections consisting of hollow or solid metal balls with magnets; discoid plate base connections; and rigid connections consisting of trapezoidal-shape, a first triangular-shape, a second triangular-shape and inverted Y-shaped continuous connections; wherein the trapezoidal-shape, the first and second triangular-shape and the inverted Y-shaped connections having at least three flat sides and having interconnection magnets housed in recesses on at least on one flat sides, for mounting with the magnets of the coupling means;

(3) a metal plate adapted to have multiple shapes simulating a ground where the structural elements will be built; the metal plate connected to the structural elements by the interconnection means;

(4) a plurality of metal cables simulating bracings and tie rods; and (5) a plurality of plastic plates adapted for horizontal, vertical or inclined locking with the individual structural vertical and cross-sectional elements and the plurality of metal cables, simulating slabs, walls and roofs of a construction.

2. The architectural mockups kit, according to claim 1, further comprising a compact rectangular box with hinged lid, containing elements (1) to (5) and an instruction manual containing illustrations of possible structures obtained with arrangements of the individual structural vertical and cross-sectional elements.

3. The architectural mockups kit, according to claim 1, wherein the pair of segments of the springs of the plurality of adjustable bars having a circular section that fits through the deformed free ends, threading them together and intercalating respective coils of the corresponding and identical deformed free ends to one another; and wherein the circular section having a reduced diameter and increased pitches, in relation to the pitches of the ends opposite to the coupling.

4. The architectural mockups kit, according to claim 1, wherein the pair of segments of the springs of the of plurality of adjustable bars having a circular section that fits through the deformed free ends, threading them together and intercalating respective coils of the corresponding and identical deformed free ends to one another; and wherein, the circular section is a hook-shape section.

5. The architectural mockups kit, according to claim 1, wherein the pair of segments of the springs of the plurality of adjustable bars, having the deformed free end formed by extended and straight parts coated with a tubular cover with a diameter that is reduced in relation to a diameter of the coils; the tubular cover, made of resilient material, serving as a guide during threading of the pair of segments of the springs to maintain the concentricity of the springs for extension adjustment or reduction of a desired length or height of the plurality of adjustable bars.

6. The architectural mockups kit, according to claim 1, wherein the pair of segments of the springs of the plurality of adjustable bars, having a flexible hose embedded along its length, made of resilient material, with a diameter that is reduced in relation to a diameter of the coils; the flexible hose serving as a guide during threading of the pair of segments of the springs to maintain the concentricity of the springs for extension adjustment or reduction of the plurality of adjustable bars for a desired length or height; and wherein the deformed free end is formed with a short bend on the coil, towards an axis of the pair of segments of the springs forming a shield for preventing the displacement the flexible hose.

7. The architectural mockups kit, according to claim 1, wherein the plates have recesses and X-shaped grooves on a lower side and chamfered edges.

8. The architectural mockups kit, according to claim 1, wherein the discoid plate base connections consisting of a discoid plate, a peripheral wall having multiple longitudinal recesses, a recessed lower side having four ring areas interconnected by cross-sectional and longitudinal grooves; each ring area having a housing adapted to hold a respective magnet; and an upper side having a central recess adapted to hold a steel ball.

9. The architectural mockups kit, according to claim 1, wherein the first triangular-shape continuous connections having a body, with four peripheral sides, the sides having a housing adapted to hold a respective magnet.

10. The architectural mockups kit, according to claim 1, wherein the second triangular-shape continuous connections having a body with at least two opposite sides, the sides having a housing adapted to hold a respective magnet.

11. The architectural mockups kit, according to claim 1, wherein the trapezoidal-shape continuous connections having a body with side walls and a base side; the base side with a central cutout, the base side and the cutout with housings for mounting a magnet.

12. The architectural mockups kit, according to claim 1, wherein the inverted Y-shaped continuous connections having a body with an inverted Y-shape cutout with side walls to form a split base with two flat sides, both sides having a housing adapted to hold a respective magnet.

* * * * *